Jan. 5, 1960 M. J. STEFFES 2,919,902
HOLLOW DRILL
Filed March 31, 1955 2 Sheets-Sheet 1
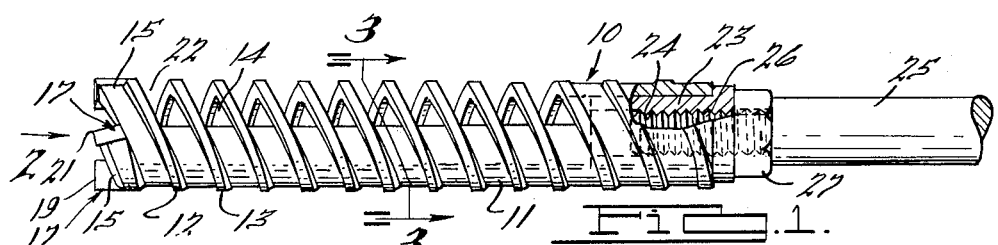
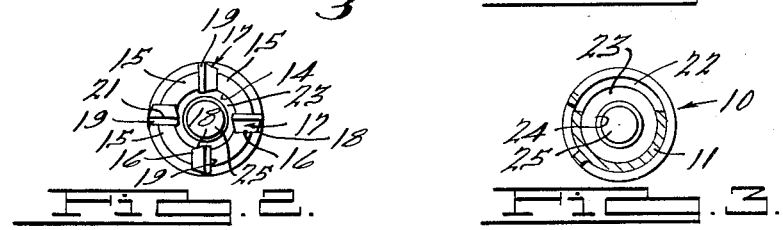
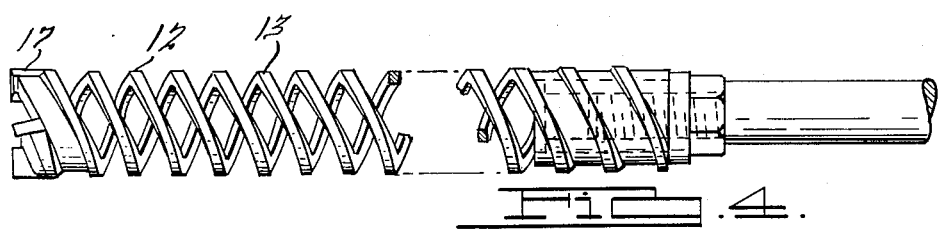
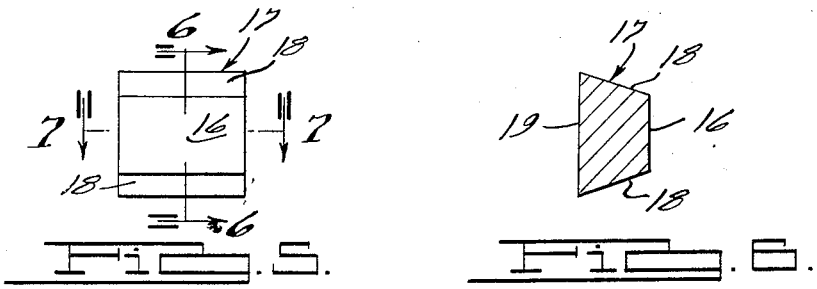
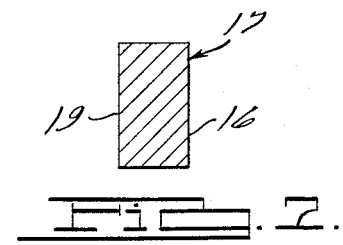
INVENTOR.
Milton J. Steffes.
BY
Harness, Dickey & Pierce
ATTORNEYS Jan. 5, 1960

M. J. STEFFES
HOLLOW DRILL 2,919,902

Filed March 31, 1955

INVENTOR.
Milton J. Steffes
BY
Harness, Dickey & Pierce
ATTORNEYS.

United States Patent Office 2,919,902
Patented Jan. 5, 1960

2,919,902
HOLLOW DRILL

Milton J. Steffes, Dearborn, Mich., assignor, by mesne assignments, to Van Norman Industries, Inc., Springfield, Mass., a corporation of Massachusetts Application March 31, 1955, Serial No. 498,154

2 Claims. (Cl. 255—72)

This invention relates to drills, and particularly to a masonry drill having hardened teeth and sloping walls which communicate with the hollow interior of the drill.

The masonry drill of the present invention embodies a hollow body with spiral threads on the outer surface thereof. The end of the tool has hardened teeth mounted thereon in a manner to produce long life and rapid cutting. The portions of the body between the thread are cut away at one side of the body to communicate the space between the threads with the hollow interior of the body. Large openings are provided in this manner for the cuttings produced by the teeth which are delivered onto the thread and conveyed upwardly away from the cutting teeth. The tool body has a sleeve at the top welded thereto containing an internal thread to which a shank having a threaded end is secured and locked by a nut on the thread. In larger sizes of drills a tube is employed having angularly disposed slots directly cut therein and in the bottom end, in the latter of which the teeth are set in a manner to produce the rapid cutting. The opposite end of the tube has an internal sleeve welded therein containing an internal thread in which the shank end of the tool containing an end thread is secured and locked by a nut thereon. The drill cuts an annular aperture leaving a central core. The cuttings produced by the teeth pass upwardly between the walls of the aperture and the surfaces of the tool, aided by the slots which keep the cuttings moving upwardly. Since the cuttings cannot fall downwardly, they must continue to move upwardly and eventually move outwardly of the body to thereby prevent the cuttings from packing about the cutting teeth of the drill. It is within the purview of the invention to cut all of the material of the tool body from between the threads when the drill is of small diameter, leaving only the threads to rapidly carry the cuttings away from the cutting end.

Accordingly, the main objects of the invention are: to provide a fast cutting masonry drill; to provide a masonry drill which rapidly cuts an annular aperture by eliminating interference with the cuttings produced thereby; to provide a masonry drill which produces rapid cutting by causing the cuttings to be raised from the aperture away from the cutting teeth during the cutting operation, and, in general, to provide a masonry drill which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Figure 1 is a view in elevation of a masonry drill having sloping surfaces in communication with the hollow interior, embodying features of the present invention;

Fig. 2 is an end view of the structure illustrated in Fig. 1 as viewed from the end 2 thereof;

Fig. 3 is a sectional view of the structure illustrated in Fig. 1, taken on the line 3—3 thereof;

Fig. 4 is a broken view of structure, similar to that illustrated in Fig. 1, showing a further form of the invention;

Fig. 5 is a view in elevation of a tooth employed in the tool illustrated in Figs. 1 and 4;

Fig. 6 is a vertical sectional view of the structure illustrated in Fig. 5, taken on the line 6—6 thereof;

Fig. 7 is a horizontal sectional view of the structure illustrated in Fig. 5, taken on the line 7—7 thereof;

Figure 8:
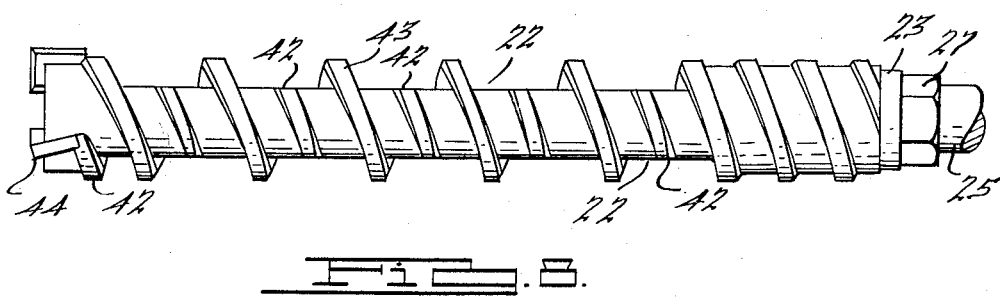
Fig. 8 is a view of a drill similar to that illustrated in Fig. 1, with the exception that a slot is provided on both sides of the body and that a thread is removed at the slotted area.
Figure 9:
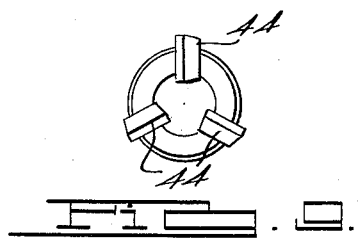
Fig. 9 is an end view of the tool illustrated in Fig. 8, showing the teeth extending into slots in the end of the tool body.

Referring particularly to Figs. 1, 2 and 3, the masonry drill 10 of the present invention comprises a hollow metal body 11 having a pair of threads 12 and 13 machined on the exterior thereof. As viewed in Figs. 1 and 2, the upper portion of the body between the threads is cut away by a suitable machining operation to provide openings 22 between the threads which communicate with the hollow interior 14 of the body. The cutting end of the tool is machined to have four sloping tooth supporting extensions 15 against which the narrow faces 16 of trapezoidal teeth 17 are secured by suitable means, such as by brazing. The teeth 17 are made of hard material, such as tungsten carbide or the like, to provide long life. The sides 18 of the teeth diverge from the narrow face 16, providing a wider cutting face 19, the side cutting edges of which are relieved due to the slope of the side faces 18. Since the teeth 17 are secured to sloping surfaces of the supporting extensions 15, the bottom cutting edges 21 thereof are relieved rearwardly thereof. In this manner, the trapezoidal shape of the tooth provides relief to the side edges thereof rearwardly of the face 19, while the tilting of the teeth produces relief to the bottom cutting edge 21 thereof which is claimed in the copending divisional application of M. J. Steffes, Serial No. 633,963, filed January 14, 1957. Large areas are provided between the teeth so that the cuttings from one tooth will not clog or interfere with the operation of the next adjacent tooth. The cuttings will be urged into the hollow interior 14 of the drill body and will pass out between the threads through the openings 22 to be carried upwardly on the thread and prevent the cuttings from packing in the bottom of the hole being drilled which would prevent the continued rapid cutting by the teeth.

The opposite end of the body has a shouldered bushing 23 welded or otherwise secured therein and provided with an internal thread 24. A shank 25 has a thread 26 on one end which is screwed into the thread 24 of the bushing 23 and locked therein by a nut 27 on the thread 26. In this manner, a very cheap, durable and rapid cutting masonry drill is formed, having hardened teeth which are formed and mounted in a manner to produce rapid cutting and provide long life to the drill.

In Fig. 4 a further form of masonry tool is illustrated which is similar to the tool illustrated in Figs. 1 to 3, having teeth 17 mounted thereon in the same manner but which has all of the material removed from between the threads 12 and 13 thereof except for the material at the ends which support the teeth 17 and the bushing 23. With this arrangement, greater openings for the cuttings are provided which fall upon the threads and are moved away from the cutting end of the tool as the cutting progresses. Strength may be provided to this type of tool by increasing the cross-sectional area of the threads and reducing the central bore of the threads to a diameter substantially equal to the diametrical distance between the teeth so that a core will not bind on the internal surface of the threads. The strength of the threads is sufficient to withstand the torque applied to the teeth during the cutting operation. The driving end of the tool is treated in the same manner as the tool of Figs. 1 to 3, a thread being provided in a shouldered sleeve 23 in the body end for supporting a shank 25.

In Figs. 5, 6 and 7, an enlarged form of tooth 17 is illustrated to clearly show the trapezoidal form thereof, caused by the sloping sides 18 reducing the width of the face 16 relative to the face 19. The face 19 is advanced in the direction of rotation of the drill so that the side edges are relieved by the sloping sides 18. In view of the fact that the face 16 is brazed against the sloping supporting extension 15, the end cutting edge 21 of the face 19 is thereby relieved so that the end and two side edges of the face 19 are relieved rearwardly to eliminate binding.

The tool illustrated in Fig. 8 is similar to that of Fig. 1, with the exception that opposite sides of the body have been cut away between the teeth to provide oppositely disposed openings 22 therebetween. One thread 42 is cut away in the area of the openings, leaving the intermediate thread 43 intact throughout the length of the body. Slots are provided in the end of the body for receiving cutting blades 44 which are brazed therein. By omitting the portions of the thread 42 in the cut-away areas 22, large openings are provided for the material cut by the teeth which will be delivered to the top surface of the thread 43 and moved upwardly from the cutting end of the tool.

Figure 10:
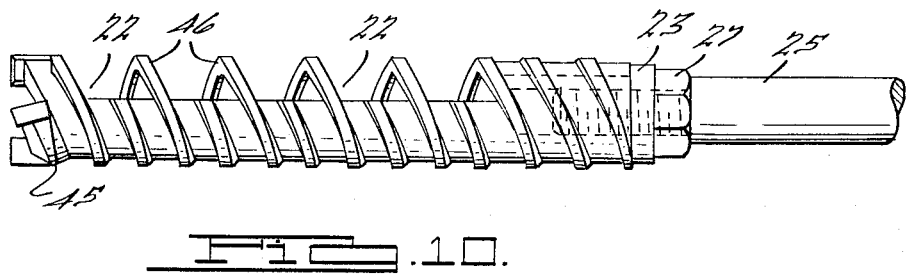
Fig. 10 is a view of a tool, similar to that illustrated in Fig. 1, having a slot on one side thereof and having portions of a thread removed at the slotted area.

In Fig. 10 a tool is illustrated exactly the same as the tool of Fig. 1, with the exception that the thread 45 thereof is cut away at the openings 22, leaving the adjacent thread 46 continuous throughout the length of the tool. By removing the one thread at the slotted areas of either tool of Figs. 8 and 10, the openings are substantially enlarged to permit the larger cuttings to move from the interior of the body and be carried upwardly on the remaining continuous thread 43 or 46 for clearing the toothed end of the tool so that it is free to produce rapid cutting at all times.

In all of the constructions herein illustrated, a masonry drill is provided which has teeth on the end disposed in such manner as to produce rapid cutting, the teeth being of trapezoidal shape and disposed at an angle to provide relief to the side and bottom cutting edges. The arcuate surfaces of the threads on the drill body communicate with the hollow interior thereof and receive the cuttings which are carried upwardly thereby away from the cutting end to prevent the cuttings from interfering with the rapid cutting operation. The opposite end of the body has a threaded sleeve in which the driving shank of the drill is secured and locked by a nut on the thread thereof.

What is claimed is:

1. A masonry drill having a hollow tubular body with a thread on the outer surface thereof, and cutting teeth on one end of said body, one side of the body being completely cut away between the convolutions of said thread over a substantial length of the body without interrupting the continuity of the thread.

2. A masonry drill having a hollow tubular body with a thread on the outer surface thereof, and cutting teeth on one end of said body, one substantially semicylindrical side of the body being completely cut away between the convolutions of said thread over a substantial length of the body without interrupting the continuity of the thread.

References Cited in the file of this patent

UNITED STATES PATENTS

| Number | Name | Date |
|---|---|---|
| Re. 23,539 | Tilden | Aug. 26, 1952 |
| 464,374 | Le Grande et al. | Dec. 1, 1891 |
| 483,210 | Corrigan | Sept. 27, 1892 |
| 799,880 | Tonge | Sept. 19, 1905 |
| 1,209,058 | Smith | Dec. 19, 1916 |
| 1,616,666 | Nebergall | Feb. 8, 1927 |
| 1,846,177 | Bascom et al. | Feb. 22, 1932 |
| 2,425,132 | Stokes | Aug. 5, 1947 |
| 2,524,570 | Phipps | Oct. 3, 1950 |